US00RE48995E

(19) United States
(12) Reissued Patent
Stolz

(10) Patent Number: US RE48,995 E
(45) Date of Reissued Patent: Mar. 29, 2022

(54) DRAGLINE CHAIN

(71) Applicant: Caterpillar Inc., Peoria, IL (US)

(72) Inventor: Michael Robert Stolz, Franklin, WI (US)

(73) Assignee: Caterpillar Inc., Peoria, IL (US)

(21) Appl. No.: 16/676,780

(22) Filed: Nov. 7, 2019

Related U.S. Patent Documents

Reissue of:
(64) Patent No.: 9,869,072
Issued: Jan. 16, 2018
Appl. No.: 15/485,686
Filed: Apr. 12, 2017

(51) Int. Cl.

| | |
|---|---|
| ***E02F 3/48*** | (2006.01) |
| ***E02F 3/58*** | (2006.01) |
| ***E02F 9/26*** | (2006.01) |
| ***F16G 13/12*** | (2006.01) |
| ***F16G 13/18*** | (2006.01) |

(52) U.S. Cl.
CPC ..... *E02F 3/48* (2013.01); *E02F 3/58* (2013.01); *E02F 9/267* (2013.01); *F16G 13/12* (2013.01); *F16G 13/18* (2013.01)

(58) Field of Classification Search
CPC .... E02F 3/48; E02F 9/267; E02F 3/58; F16G 13/18; F16G 13/12
See application file for complete search history.

(56) References Cited

U.S. PATENT DOCUMENTS 2,895,290 A * 7/1959 Devonshire ..... F16G 13/14 59/90
3,744,239 A * 7/1973 I'Anson ..... F16G 13/14 59/84
4,134,255 A * 1/1979 McBain ..... F16G 13/00 59/78
4,354,344 A * 10/1982 Yagi ..... B21L 13/00 59/27
5,956,936 A * 9/1999 Ianello ..... E02F 3/58 59/90
6,178,824 B1 1/2001 Hayakawa et al.
6,925,794 B2 * 8/2005 Dalferth ..... B66D 3/26 474/155
7,107,754 B2 * 9/2006 Sinz ..... F16G 15/12 474/155
8,756,907 B2 6/2014 Briscoe et al.
8,931,251 B1 * 1/2015 Cipolla ..... F16G 13/12 116/200
8,955,301 B2 * 2/2015 Segura ..... F16G 13/12 59/90

(Continued)

FOREIGN PATENT DOCUMENTS

CN 102556593 A * 7/2012 ..... B65G 19/20
CN 105351444 A 2/2016
GB 2486573 A * 6/2012 ..... F16G 13/12

OTHER PUBLICATIONS

English Translation of CN 102556593A (Year: 2012).*

(Continued)

*Primary Examiner* — Terrence R Till
(74) *Attorney, Agent, or Firm* — Law Office of Kurt J. Fugman LLC

(57) ABSTRACT

A method for maintaining a chain or chain link comprises inspecting the chain or chain link for signs of wear without using tools and changing the orientation of the chain or chain link or replacing the chain or chain link if signs of wear are detected.

29 Claims, 10 Drawing Sheets

Amended

(56) References Cited

U.S. PATENT DOCUMENTS

| | | | | |
|---|---|---|---|---|
| 9,434,428 | B2 * | 9/2016 | Hakes | B62D 55/20 |
| 2008/0214344 | A1 * | 9/2008 | Lodge | G01L 5/047<br>474/207 |
| 2013/0333348 | A1 * | 12/2013 | Pengg | B21K 1/76<br>59/35.1 |
| 2014/0090351 | A1 * | 4/2014 | Scherf | F16G 13/18<br>59/84 |
| 2014/0368021 | A1 * | 12/2014 | Scherf | E21C 27/34<br>299/82.1 |
| 2015/0020496 | A1 * | 1/2015 | Benecke | B65G 19/20<br>59/84 |
| 2015/0149049 | A1 * | 5/2015 | Bewley | E02F 9/2816<br>701/50 |

OTHER PUBLICATIONS

First Office Action in Chinese Patent Appln. 2018103163738, dated Apr. 27, 2021, 8 pgs. (with English translation of first two pages; references US20130318749A1 and US2015020496A1 cited in the CN OA already are of record and so have not been cited again).

* cited by examiner

Amended

Amended

DRAGLINE CHAIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure relates to chain assemblies that are used in dragline mining operations and the like. More specifically, the present disclosure relates to a dragline bucket chain assembly that includes wear indicators.

BACKGROUND

Referring initially to FIG. 1, chains 100 have historically been used in dragline buckets 102 in the hoist and drag circuits. Some rigging configurations also use chains in the dump circuit (single dump block systems). Chains 100 have in the past been cast, forged, comprised structural plate, etc.

These chains comprise a plurality of links that are interconnected and engage each other in the region called the "bite" region of the links. This usually corresponds to the inside radial portion of an end of the chain link. This area is subjected to tension loads in use and/or abrasion from the material located in the work area. Over time, this bite region may wear down, compromising the strength of the chain link, and therefore, of the chain as a whole. Consequently, the chain may need to be replaced.

Similarly, the middle portions (sometimes referred to as "rails") of the chain link, situated between the ends of the chain link may also be subject to wear from abrasion from the material located in the work area, necking due to tensile loads, etc. Once the middle portion of the chain link becomes too thin, the chain link strength and the overall chain strength may be compromised. Consequently, the chain may need to be replaced.

Current practices to monitor these various types of wear include inspection methods to determine when the chains need to be replaced, rotated ninety degrees, or flipped. In some cases, gauges, measuring tapes, and calipers may be employed to determine if a minimum dimension of the chain link has been reached. When inspecting the bite region on the chain links, it may be necessary to pry the chain link apart to measure and inspect. This can be time consuming and may damage the chain undesirably.

Accordingly, it is desirable to develop a better method for inspecting chain links for wear than has yet been devised.

SUMMARY OF THE DISCLOSURE

A chain link according to an embodiment of the present disclosure comprises a body including two end portions and two middle portions connecting the two end portions together, wherein at least one middle portion defines at least one region including at least one wear indicator.

A chain assembly according to an embodiment of the present disclosure comprises at least two chain links interconnected with each other, and at least one of the chain links includes a body including two end portions, wherein at least one end portion defines a bite region including a bite contact surface configured to contact the other chain link and that defines a load vector, the at least one end portion including a first portion with a reduced cross-section defining a first thickness measured along a direction that is non-parallel to the load vector, and a raised rib disposed between the bite region and the first portion along a direction parallel with the load vector, the raised rib defining a second thickness along a direction that is non-parallel to the load vector, wherein the second thickness is greater than the first thickness.

A method for maintaining a chain or chain link according to an embodiment of the present disclosure comprises inspecting the chain or chain link for signs of wear without using tools and changing the orientation of the chain or chain link or replacing the chain or chain link if signs of wear are detected.

DETAILED DESCRIPTION

Figure 1:
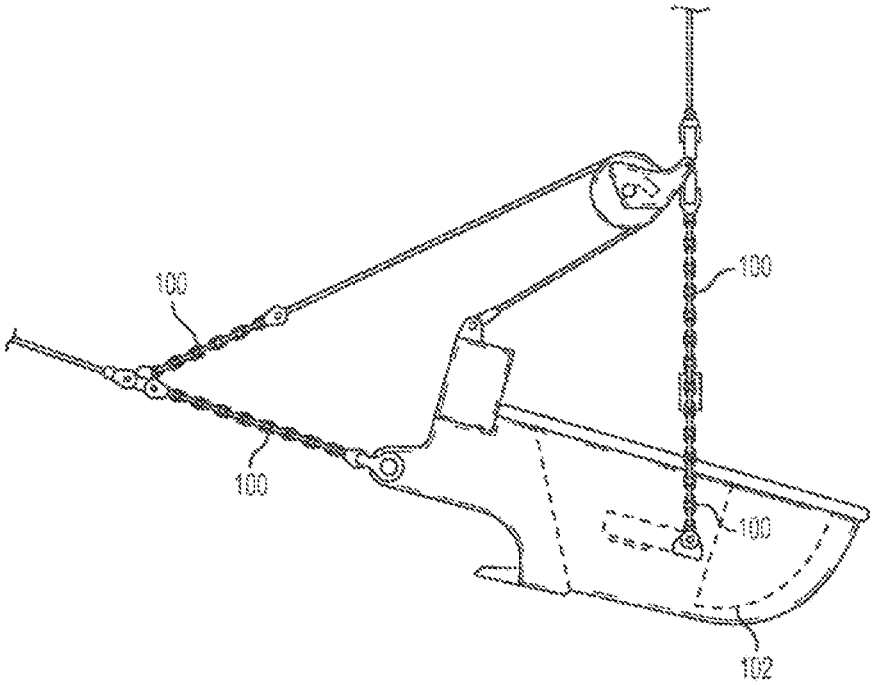
FIG. 1 PRIOR ART
FIG. 1 is a side view of a dragline bucket that is suspended and pulled using chains as is known in the art.
Figure 2:
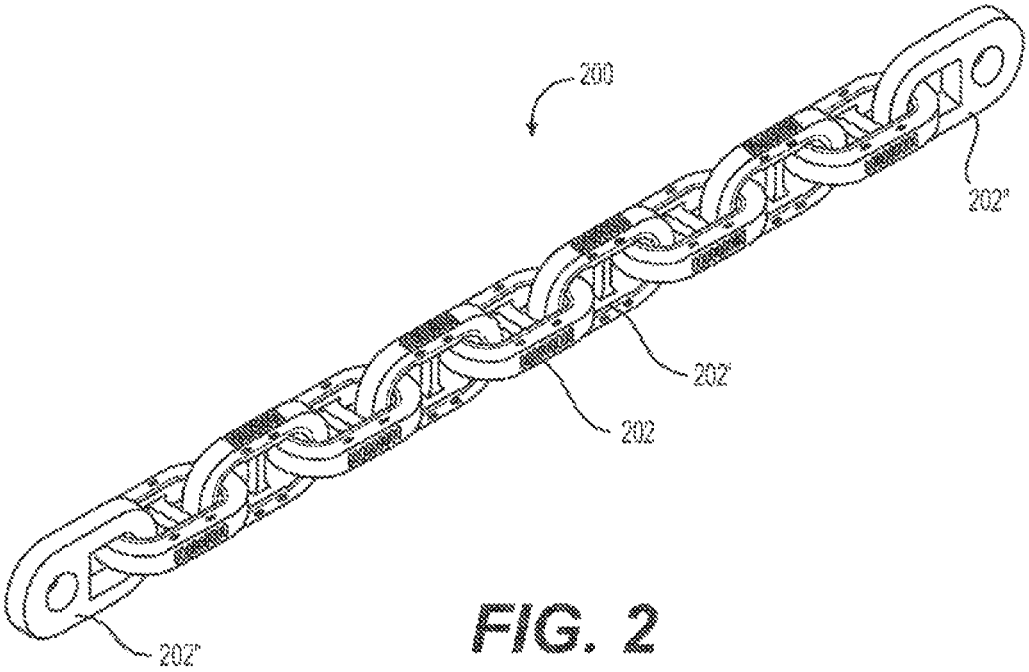
FIG. 2 is a perspective view of a chain that may be used in an applications such as shown in FIG. 1 shown in isolation from a bucket or any other apparatus, giving an example of a chain according to an embodiment of the present disclosure where a plurality of chain links have wear indicators and/or a rib proximate the bite area of the chain.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

In various embodiments, a chain link with wear indicators that do not require the use of gauges, measuring tapes, calipers or the like may be provided. This may make it safer to inspect without having to pry chain links apart to inspect the bite regions. In certain embodiments, a raised rib may be provided in the bite region that may serve two functions. First, the raised rib may provide a wear indicator. Second, the raised rib may provide increased bearing surface area (such as 15% or more), strengthening the chain link and possibly slowing down the wear rate in the bite region of the chain link. Various embodiments of this type of chain link may allow the user to use a method of use or monitoring the wear and replacing a chain link, a chain, or changing the orientation of a chain link or chain without using tools.

Looking at FIGS. 2 thru 5, a chain assembly 200 according to an embodiment of the present disclosure is illustrated. The chain assembly 200 comprises at least two chain links 202, 202' interconnected with each other, and at least one of the chain links 202 includes a body 204 including two end portions 206. At least one end portion 206 defines a bite region 208 including a bite contact surface 210 configured to contact the other chain link and that defines a load vector L.

Figure 6:
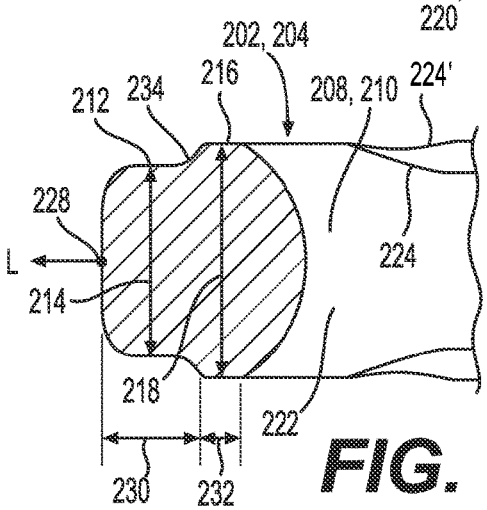
FIG. 6 is a sectional view of the chain link of FIG. 5 taken along lines 6-6 thereof, depicting the addition of a rib in the bite area of the chain link member.

As best seen in FIG. 6, this end portion 206 may include a first portion 212 with a reduced cross-section defining a first thickness 214 measured along a direction that is non-parallel to the load vector L, and a raised rib 216 disposed between the bite region 208 and the first portion 212 along a direction parallel with the load vector L. The raised rib 216 may define a second thickness 218 along a direction that is non-parallel to the load vector L, wherein the second thickness 218 is greater than the first thickness 214. This raised rib may be used on either a body or intermediate link 202 or an end link 202". An end link may also have wear indicators as will be later described herein. In some embodiments, an end link or a body link of the chain may lack a raised rib or wear indicators, etc.

Referring back to FIGS. 2 thru 5, the body 204 defines a center of mass C and a Cartesian coordinate system with an X-axis, Y-axis, a Z-axis and an origin O positioned at the center of mass C. For this embodiment, both the end portions 206 define a load vector L for the body 204 for this chain link 202 and the X-axis of the coordinate system is oriented parallel with the load vector L. The body 204 further includes a first middle portion 220 and a second middle portion 220' (in some embodiments the middle portions may be referred to as rails) connecting the two end portions 206 together, forming an enclosed perimeter. In some cases, the chain link 202 may not form an enclosed perimeter. For the embodiment shown in FIG. 3, the chain link has an oval shape (more specifically a "race track" shape) but other shapes are contemplated such as circular, rectangular, elliptical, etc.

More particularly, the first middle portion 220 and the second middle portion 220' are straight, extending along a direction parallel to the X-axis. This may not be the case for other embodiments. In some cases, the chain link may not form an enclosed perimeter. The end portion 206 defines a first curved portion 222 extending from the first middle portion 220 to the second middle portion 220' and the raised rib 216 extends from the first middle portion 220 to the second middle portion 220' along the first curved portion 222. A first ramp 224 is provided to transition from the lowest part 226 of the middle portion 220 to the raised rib 216.

Focusing on FIG. 6, the first and second thicknesses 214, 218 respectively are measured in a direction perpendicular to the load vector L and the ratio of the second thickness 218 to the first thickness 214 ranges from 1.1 to 1.5 for some embodiments and more particularly about 1.25 for some embodiments. Likewise, the end portion 206 defines a first extremity 228 along a direction that is parallel to the load vector L and the first portion 212 with a reduced cross-section defines a third thickness 230 measured along a direction that is parallel to the load vector L from first extremity 228 to the raised rib 216.

Also, the raised rib 216 defines a fourth thickness 232 measured along a direction that is parallel to the load vector L from the first portion 212 with a reduced cross-section to the bite contact surface 210, and a ratio of the fourth thickness 232 to the third thickness 230 ranges from 0.30 to 0.50 and more particularly for some embodiments may be approximately 0.38. The body 204 further defines a radiused portion 234 that transitions from the raised rib 216 to the first portion 212 with a reduced cross-section. The radiused portion 234 may have a radius in a plane similar to that shown in FIG. 6 having a value ranging from 0 (near the ramp areas) to 1.0 inch. In some embodiments a full radius 234 may be employed such there is no straight surface between the raised rib 216 and the first portion with reduced cross-section. In such a case, the radius may vary between 0.25 and 4 inches. The radiused portion 234 transitioning from the first portion 212 having a reduced cross-section to the raised rib 216 may be included when measuring the third thickness 230 of the first portion 212. Similarly, any blending radii or the like at corners may be included when measuring the fourth thickness 232 of the raised rib 216, etc. Other transition geometery may be substituted with or for a radius such as a chamfer or other curved surface, etc.

Returning to FIGS. 2 thru 5, the middle portion 220 of the chain link 202 defines a [first] *bottom* region 236 including at least [a first] *one bottom* wear indicator 238, and a [second] *side* region 240 including at least [a second] *one side* wear indicator 238'. In some embodiments, only one region 236, 240 may have a wear indicator 238 for reasons that will be explained later herein. The [second] *side* wear indicator 238' has an elongated shape extending in a direction parallel to the load vector L and the [first] *bottom* wear indicator 238 has an elongated shape extending in a direction perpendicular to the load vector L.

Figure 8:
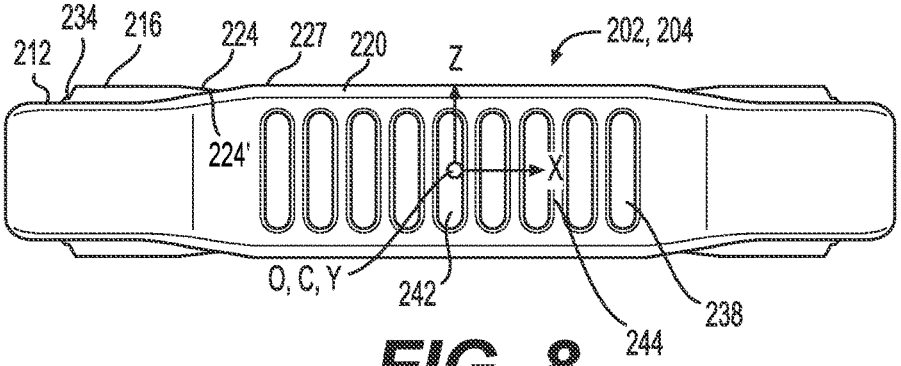
FIG. 8 is a side view of the chain link of FIG. 3 or the bottom view of the chain link of FIG. 4.

FIG. 8 shows that the top and bottom parts 227 of the middle portions 220 of the chain link 202 are substantially coplanar with the top and bottom extremities of the raised ribs 216. Also, a second ramp 242 is provided to transition from the top or bottom extremities of the middle portions 220 to the plane of the first portion 212 with a reduced cross-section. Other configurations are possible. Nine pockets 242 are provided as wear indicators 238 on the top or bottom surface 244 of the middle portion 220. The middle pocket 242 is centered relative to origin O of the Cartesian coordinate system, and hence, the center of mass C for the chain link 202. The pockets on the bottom surface are positioned equidistant from each other along the X-axis. The number, configuration, and placement of the wear indicators may be varied for other embodiments. For example, five to fourteen pockets may be provided on a middle portion for some embodiments.

Figure 5:
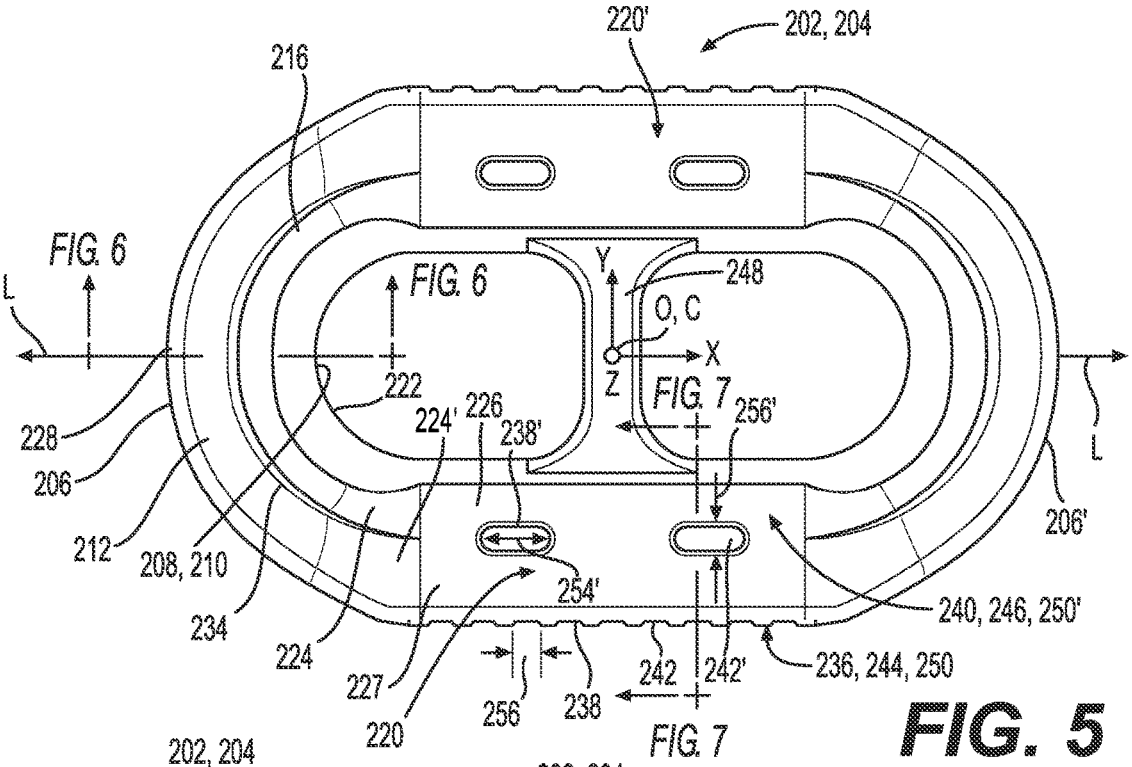
FIG. 5 is a top view of the chain link of FIG. 3 or side view of the chain link of FIG. 4.

In like fashion, looking at FIG. 5, two wear indicators [238] *238'* are provided on the side surfaces 246 of the middle portion 220 of the chain link 202. They are positioned approximately halfway between the Y-Z plane defined by the coordinate system and the beginning of the curved portion 222 of the ends 206 of the chain link 202. Again, the number, configuration, and placement of the wear indicators 238 may be varied for other embodiments. Any of the wear indicators 238 discussed herein may be proud (e.g. a rib) or recessed (e.g. a pocket) depending on the embodiment or the application, etc. A strut 248 is provided to help the chain link 202 resist necking when loaded in tension. This strut may be omitted in other embodiments.

Factors that may cause the configuration or placement of the pockets or other wear indicators to vary include the chain thickness, soil wash, material of the chain link, historical data concerning areas with a high wear rate, etc.

Figure 3:
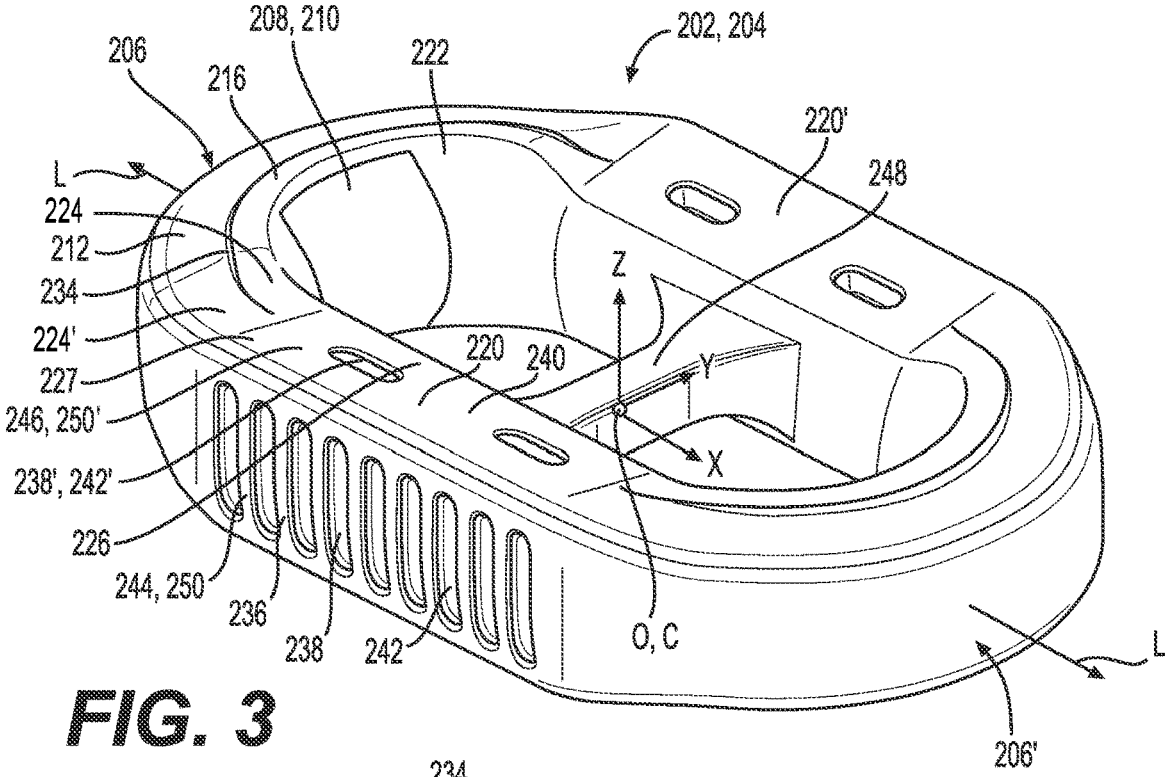
FIG. 3 is a perspective view of a chain link according to an embodiment of the present disclosure showing wear indicators and a rib proximate the bite area of the chain link. The chain link is shown in a substantially horizontal orientation.
Figure 4:
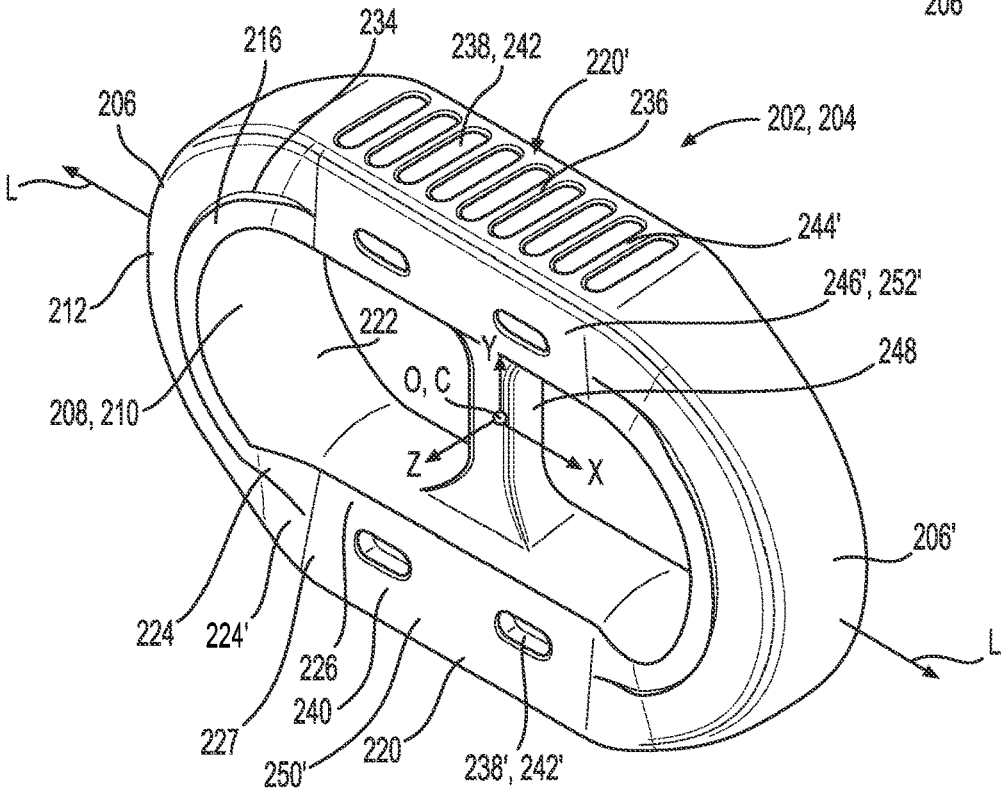
FIG. 4 is an alternate perspective view of the chain link of FIG. 3 shown in a substantially vertical orientation.

Further details of an embodiment of the chain link 202 according to the present disclosure will now be discussed with reference to FIGS. 3 thru 5. As already alluded to, the body 204 of the chain link 202 includes two end portions 206 and two middle portions 220 connecting the two end portions 206 together. At least one middle portion 220 defines at least one region 236, 240 including at least one wear indicator 238. For example, the region could be on a side surface 246 or bottom surface 244 of the middle portion 220 of the chain link 202. The body 204 defines a center of mass C and a Cartesian coordinate system with an X-axis, Y-axis, a Z-axis and an origin O positioned at the center of mass C.

Furthermore, the end portions 206 define a load vector L for the body 204 of the chain link 202 and the X-axis of the coordinate system is oriented parallel with the load vector L. In this embodiment, the X-axis is often coextensive with the load vector L in use. However, this may not be the case if the chain link is differently configured or the chain becomes kinked, causing the bite contact surface 210 to change location along the curved portion 222 of the end 206 of the chain link 202, etc. The end portions 206 are C-shaped or half of a circular diameter, facilitating the movement of one chain link relative to another chain link but other curved or arcuate shapes are possible.

Figure 7:
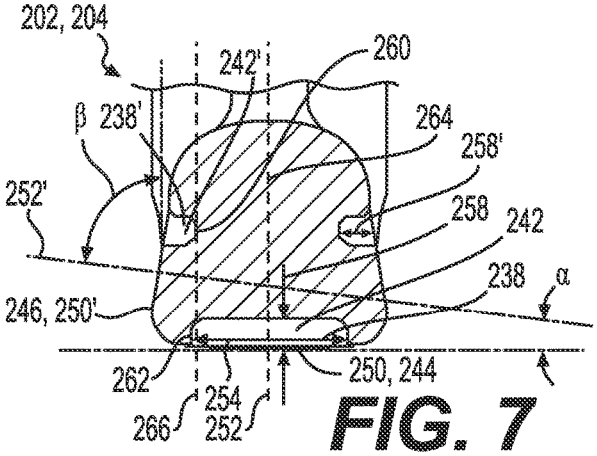
FIG. 7 is a sectional view of the chain link of FIG. 5 taken along lines 7-7 thereof, depicting the configuration of the pockets on the middle portions of the chain link, which act as wear indicators.

As best seen in FIG. 7 for this embodiment, at least one middle portion 220 defines a first surface [250] *250'* defining a first surface normal [252] *252'* that is non-parallel to the X-axis, and the at least one wear indicator [238] *238'* is disposed on the first surface [250] *250'*. This *first* surface *250' is shown as the side surface 246 in FIG. 7, but* may be the bottom [or side] surface 244[, 246 shown in FIG. 7 for example] *in other embodiments of the present application, etc*. For the bottom surface 244, [the first] *another* surface normal 252 is parallel to the Y-axis. For the side surface 246, the first surface normal 252' is non-parallel to the Z-axis and the Y-axis. In some embodiments, this first surface normal 252' forms an angle α with a direction parallel to the Z-axis that ranges from 5 to 10 degrees. Put another way, the first surface normal 252' forms an angle β with a direction parallel to the Y-axis that ranges from 80 to 85 degrees. These angles may be varied. For example, the side surface may be perpendicular to the Y-axis, etc.

Similarly, for this embodiment as best seen by looking at FIGS. 7 and 8, at least one wear indicator [238] *238'* includes a first pocket [242] *242'* defined by the first surface [250] *250'* such as the [bottom] *side* surface [244] *246*. The first pocket [242] *242'* is elongated along a direction parallel with the [Y-axis] *X-axis* defining its maximum dimension [254] *254'* oriented along the [Z-axis] *X-axis*, the first pocket [242] *242'* further defining a width [256] *256'* along a direction parallel along the [X-axis] *Y-axis* and a depth [258] *258'* along a direction parallel with the [Y-axis] *Z-axis*. By way of example, dimension [254] *254'* may vary between 0.5 and 5 inches for some embodiments, width [256] *256'* may vary between 0.12 and 1.5 inches in some embodiments, and the depth [258] *258'* may vary between 1.5 and 7 inches in some embodiments.

Looking at FIGS. 5 and 7, a second surface [250'] *250* such as a [side] *bottom* surface [246] *244* may also be provided defining a second surface normal [252'] *252* that is non-parallel to the X-axis. This second surface [250'] *250* may include a second wear indicator 238 in the form of a second pocket [242'] *242* that is elongated along a direction parallel with the [X-axis] *Z-axis* defining its maximum dimension [254'] *254* oriented along the [X-axis] *Z-axis*, the second pocket further defining a width [256'] *256* along a direction parallel with the [Y-axis] *X-axis* and a depth [258'] *258* along a direction parallel with the [Z-axis] *Y-axis*. By way of example, dimension [254'] *254* may vary between 0.5 and 5 inches for some embodiments, width [256'] *256* may vary between 0.12 and 1.5 inches in some embodiments, and the depth [258'] *258* may vary between 1.5 and 7 inches in some embodiments.

For the embodiment shown FIGS. 5 and 7, the [second] *first* pocket 242' defines a bottom extremity 260 positioned along a direction parallel with the Z-axis and the [first] *second* pocket 242 defines an end extremity 262 positioned along a direction parallel with the Z-axis. In addition, as best seen in FIG. 7, the Cartesian coordinate system establishes a first [X-Z] *X-Y* plane 264 positioned at the origin of the Cartesian coordinate system and the body of the chain link defines a second [X-Z] *X-Y* plane 266 spaced away from the first [X-Z] *X-Y* plane 264 that is disposed between the bottom extremity 260 of the [second] *first* pocket 242' and the end extremity 262 of the [first] *second* pocket 242. As a result, the end extremity 262 of the [first] *second* pocket 242 will be worn away before the [second] *first* pocket 242' wears away completely (but will only be very faintly seen). In some cases, the end extremity 262 of the [first] *second* pocket 242 and the bottom extremity 260 of the [second] *first* pocket 242' may lie substantially in the same [X-Z] *X-Y* plane. That is to say, as soon as the [second] *first* pocket 242' is worn away, the end extremity [262'] *262* of the [first] *second* pocket 242 may also be worn away.

It is contemplated that the second pocket [242'] *242* and its function may be replaced by instructing the user that when the end extremity 262 of the first pocket [242] *242'* is worn away, the side surface 246 has been worn to or past a minimum acceptable dimension. It is further contemplated that the orientation of the second pocket [242'] *242* may change so that it is elongated along a direction substantially parallel with the Y-axis so that the first pocket [242] *242'* and its function may be replaced by instructing the user that when the end extremity of the second pocket is worn away, the bottom surface 244 has been worn to or past a minimum acceptable dimension.

The orientation of the pockets on the bottom or top surface may allow material in the work area such as sand or loose material or the like to be trapped in the pockets. As a consequence, more material may adhere to the trapped material, forming a protective layer on the underside of the chain link, helping to reduce the wear rate. Similar benefits may be obtained in other regions of the track link depending on the configuration of the features and the track link.

For the embodiments shown in the figures, the Cartesian coordinate system establishes a X-Y plane, a Y-Z plane, and a first X-Z plane 264. The body 204 of the chain link 202 is shown to be symmetrical about the X-Y plane, the first X-Z plane and the Y-Z plane. This increases the versatility of orientation changes possible for this track link once signs of wear occur at one or more places. However, it is contemplated that other embodiments may have one, two or no planes of symmetry, etc.

Here are some exemplary dimensions of the chain link. The overall length of the chain link in the X direction may range from 4 to 40 inches and the overall height of the main link member may range from 2 to 20 in the Y direction. Often, there is a two to one ratio concerning the length of the chain link in the X direction versus its height in the Y direction. A length of the strut in the X direction and height in the Z direction may be a quarter of the width of the gap (this gap is the distance from the inner arcuate surface of one C-shaped end to the inner arcuate surface of the other C-shaped end, which may range from 4 to 38 inches for example). The dimensions of the main cross-section of the chain link may be substantially constant around the oval perimeter and may include a height in the Z direction of about half an inch and a thickness in the Y direction of about an inch. The thickness of the chain in the Y direction may range from one to seven inches. Any of the dimensions discussed anywhere herein may vary as needed or desired. Also, the ratios of the dimensions discussed herein may be scaled up or down based on the embodiment or application or may be otherwise varied as needed or desired.

The chain link may be made from any suitable material including iron, grey cast-iron, steel, etc. Also, the chain link may be integrally cast, forged or may be fabricated and assembled by fastening, welding, press fitting, etc. two or more pieces together to form the chain link.

Figure 9:
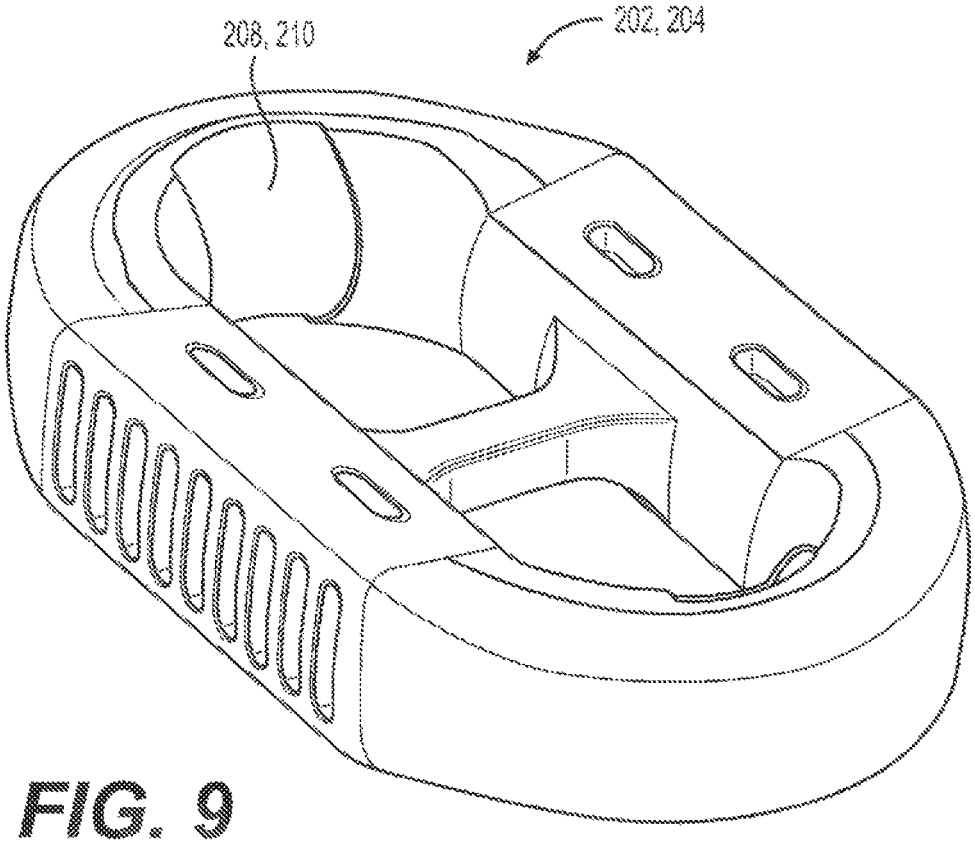
FIGS. 9 and 10 illustrate the chain link of FIG. 3 where the bite area of the chain link has reached a first stage of wear.
Figure 10:
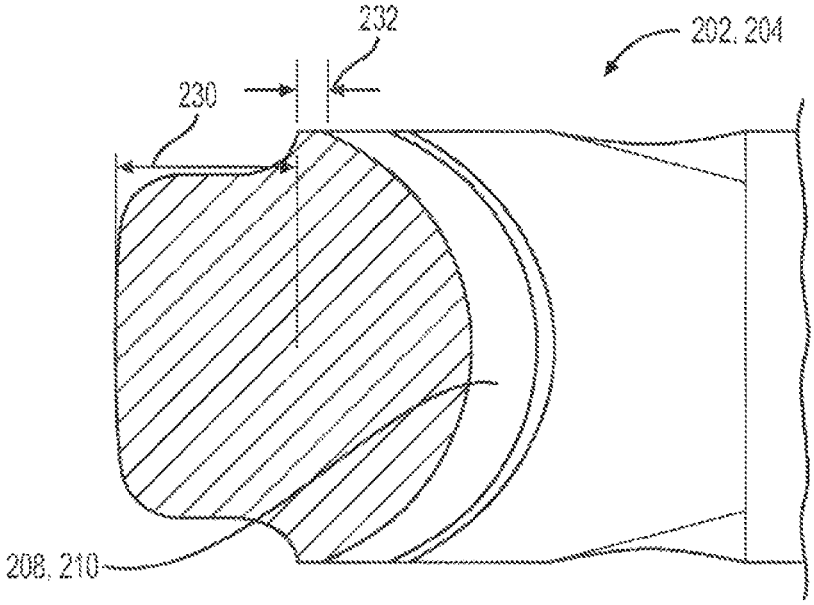

FIGS. 9 and 10 illustrate the chain link 202 after it has reached a first stage of wear in the bite region 208 during the useful life of the chain link. This wear takes place over time due to several factors including tension and rubbing between the links, abrasion from the material in the work area, etc. The ratio of the fourth thickness 232 to the third thickness 230 as shown in FIG. 10 may be approximately 0.1 to 1.0 for some embodiments at this stage of wear. The contact surface area 210 at this point has not decreased substantially so the chain link 202 still has some useful life left.

Figure 11:
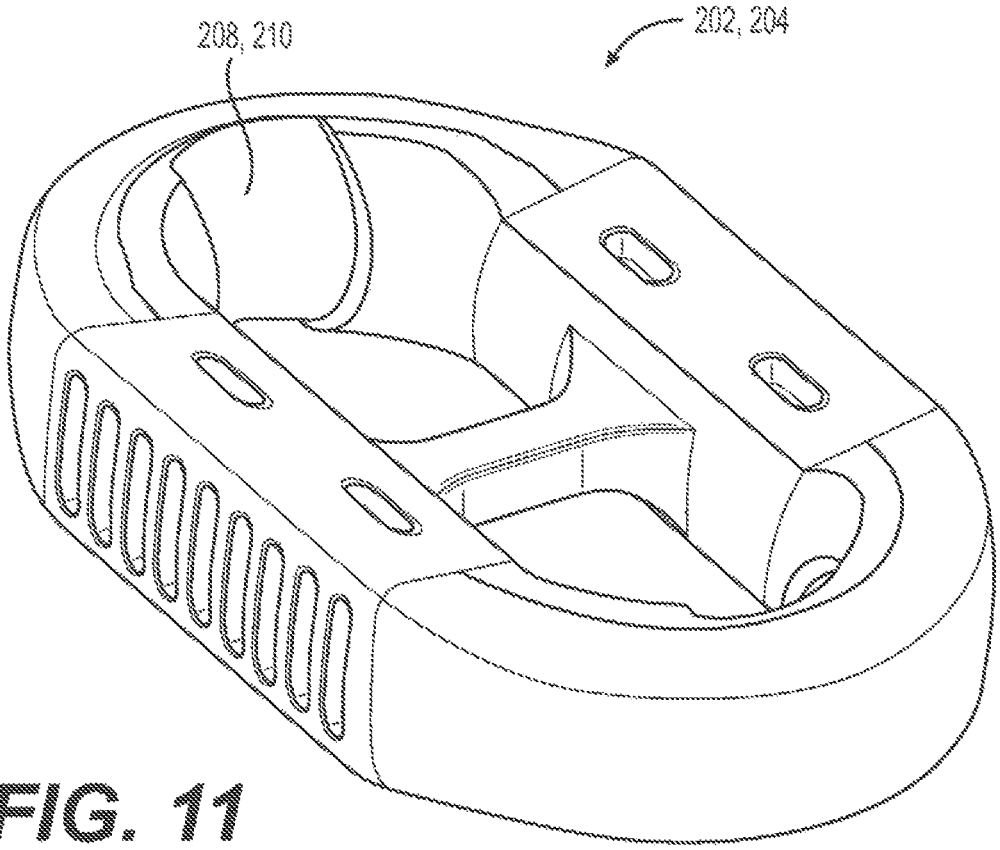
FIGS. 11 and 12 illustrate the chain link of FIGS. 9 and 10 after the bite area of the chain link has reached a second stage of wear, indicating that the chain link will need to be replaced soon.
Figure 12:
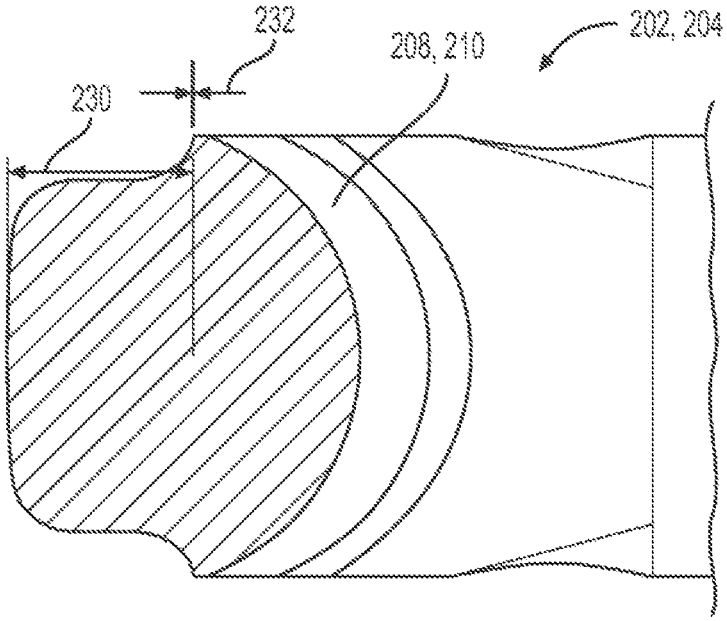

In FIGS. 11 and 12, the chain link 202 has reached a second stage of wear in the bite region 208. At this stage, the ratio of the fourth thickness 232 to the third thickness 230 approached zero, meaning that the contact surface area 210 is about to start decreasing quickly. So, the user would be alerted that it is time to start thinking about replacing the chain link 202 or chain 200.

Figure 13:
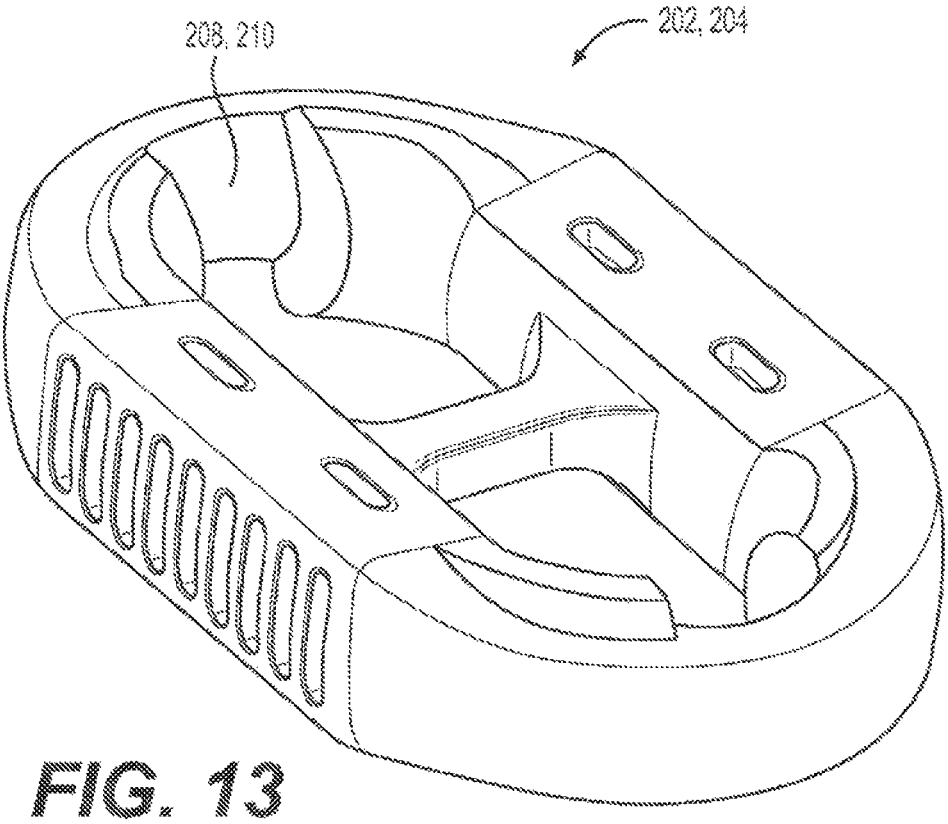
FIGS. 13 and 14 show the bite area of the chain link of FIGS. 11 and 12 after the chain link has reached a third stage of wear, requiring that the chain link be replaced.
Figure 14:
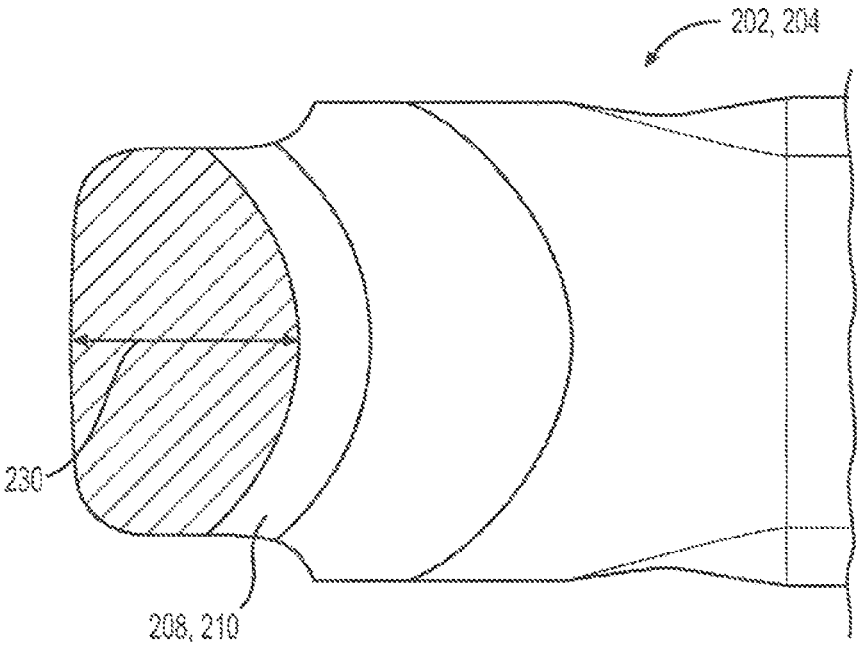

The final stage of wear for the bite region 208 is represented by FIGS. 13 and 14. At this stage, the ratio of the fourth thickness (not shown now because it has disappeared) to the third thickness 230 has reached zero. Now, the chain 200 or chain link 202 needs to be replaced as the contact surface area 210 is reduced, making the chain 200 or chain link 202 no longer useful in its intended application.

Figure 15:
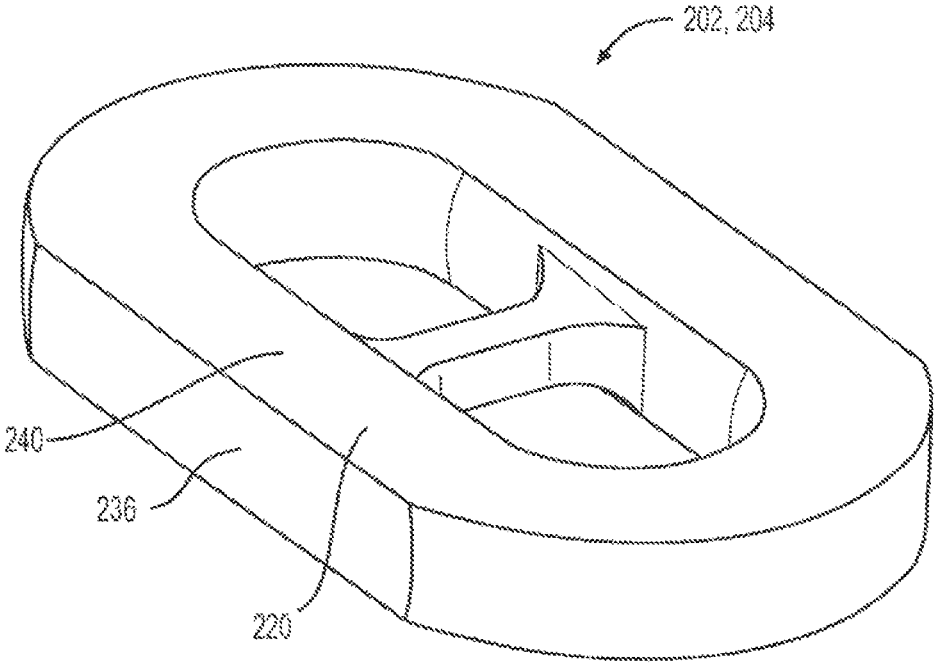
FIGS. 15 and 16 depict the chain link of FIG. 3 where both the bottom surface and the side surfaces of the chain link have been worn away, requiring replacement of the chain link.
Figure 16:
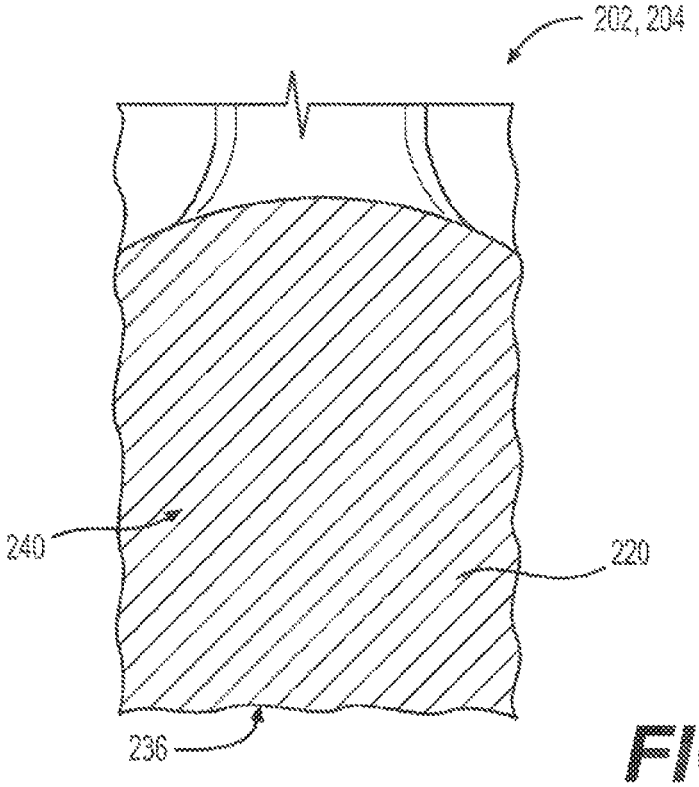

Referring now to FIGS. 15 and 16, both regions 236, 240 of the middle portions 220 of the chain link 202 have worn away, meaning that it is also time to replace the chain 200 or chain link 202.

Figure 17:
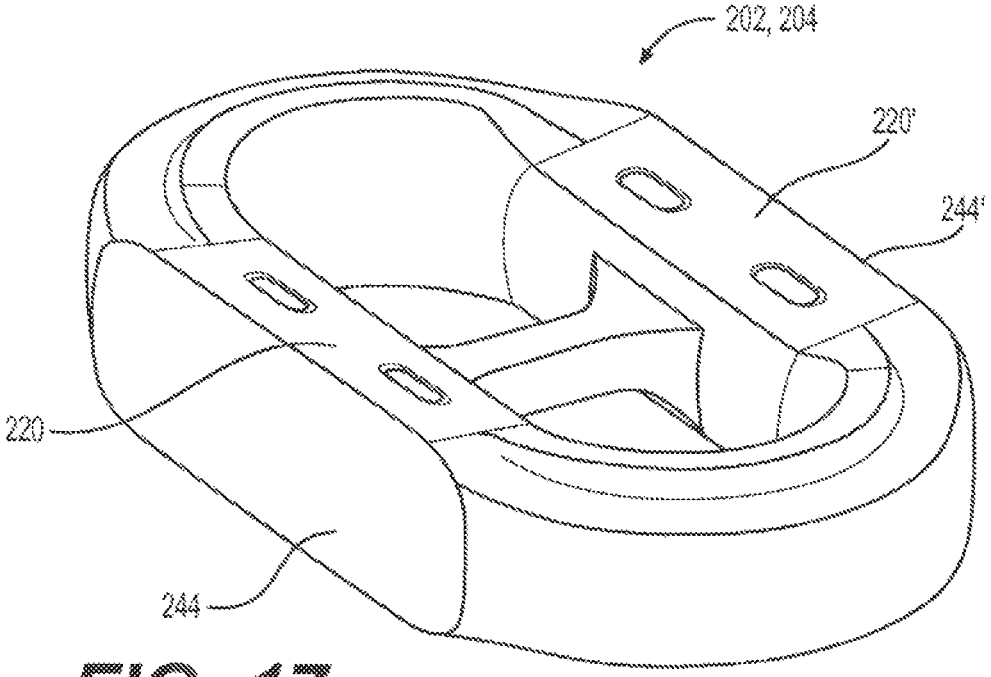
FIGS. 17 and 18 illustrate the chain link of FIG. 3 where the bottom surface of the chain link has been worn away, requiring at least that the chain link be rotated ninety degrees from the horizontal to the vertical orientation.
Figure 18:
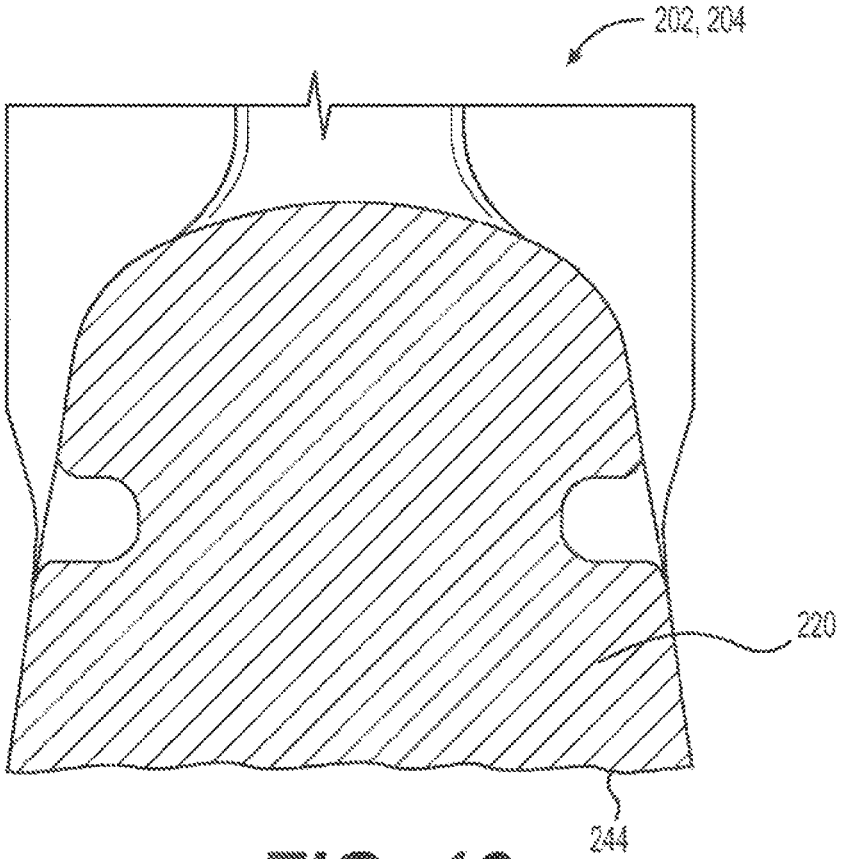

FIGS. 17 and 18 depict a scenario where the bottom surface 244 of one middle portions 220 has worn out. So, it may be necessary to rotate the chain 200 or chain link 202 ninety or one hundred eighty degrees about the load vector L to continue using the chain. In order to rotate the chain link 180 degrees, it is desirable to check that the opposite corresponding surface 244' on the other middle portion 220' has not worn away. Alternatively, the chain 200 or chain link 202 could be replaced.

Figure 19:
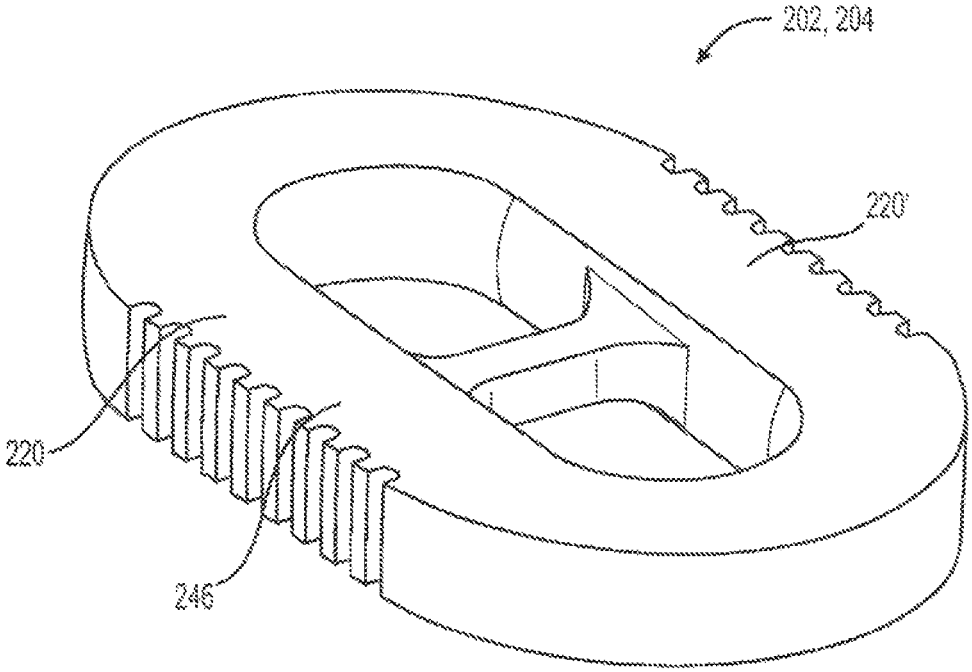
FIGS. 19 and 20 depict the chain link of FIG. 3 where the side surfaces of the chain have been worn away, requiring that the chain link be rotated ninety degrees from the horizontal to the vertical orientation.
Figure 20:
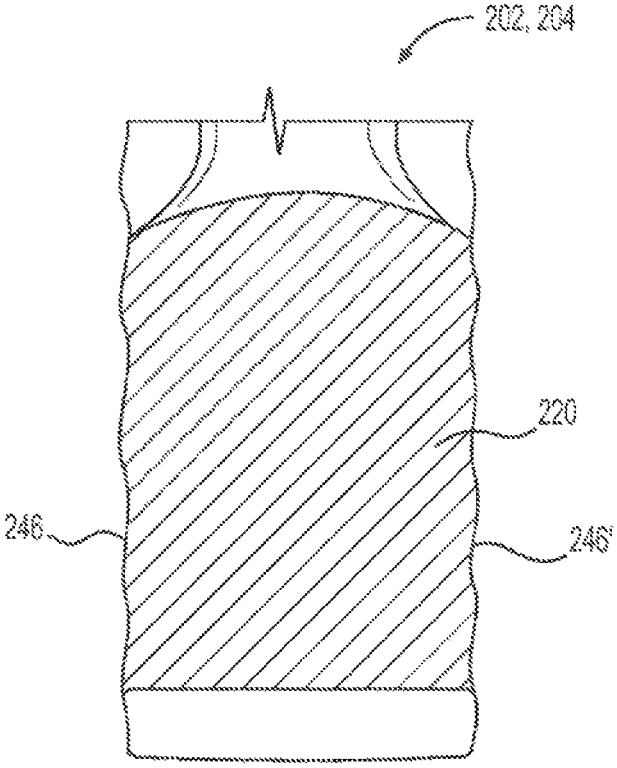

Lastly, FIGS. 19 and 20 show a scenario where the side surfaces 246 of the middle portions 220 of the chain link 202 have worn away, requiring that the chain 200 or chain link 202 be rotated ninety degrees about the load vector L. Alternatively, the chain 200 or chain link 202 could be replaced.

INDUSTRIAL APPLICABILITY

In practice, a chain link or chain according to any embodiment described, shown or discussed herein may be sold, bought, manufactured, remanufactured, retrofitted, assembled or otherwise obtained in an aftermarket or OEM context.

A chain link according to any embodiment described herein may be designed using an existing chain link design and modifying the design as needed or desired. For example, a chain link design having a trapezoidal shape may be changed to that shown in FIG. 6 where a substantially square shape is provided having the same cross-sectional areas as the original trapezoidal shape. In particular, the first thickness 212 for the design in FIG. 6 is greater than the corresponding dimension located at the extremity 228 of the previous trapezoidal shape. At the same time, the second thickness 218 may be approximately the same for the embodiment shown in FIG. 6 as the corresponding maximum trapezoidal dimension of the previous design. The cross-section in the rail or middle portions may remain much the same. Other design techniques are possible.

Figure 21:
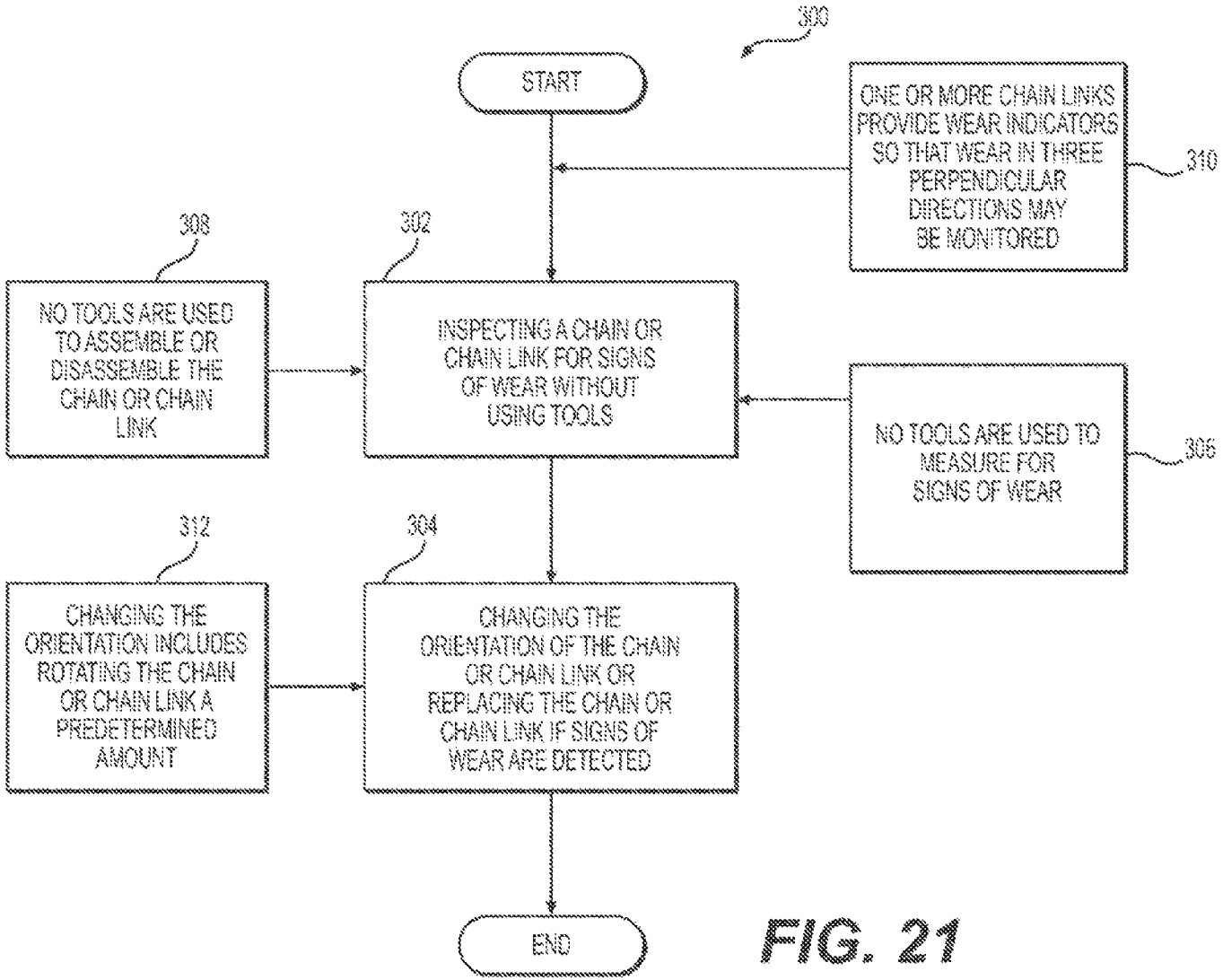
FIG. 21 contains a flowchart delineating a method of using or maintaining a chain link having a rib in its bite area and/or wear indicators on either of its middle portions.

A chain or chain link according to any embodiment described, discussed or shown herein may be used with the following method shown in FIG. 21 for using or maintaining such a chain or chain link.

The method 300 includes inspecting a chain or chain link for signs of wear without using tools (step 302). Then, if signs of wear are detected, the method includes changing the orientation of the chain or the chain link or replacing the chain (step 304). In some embodiments, the inspection step 302 is achieved without using tools to actually measure wear (step 306). For example, no gauges, templates or other measuring tools may be needed. In other embodiments, the inspection step 302 is achieved without using tools to assemble or disassembly the chain or a chain link (step 308). For example, no tools may be needed to pry a chain link apart or separate one chain link from another chain link. In other embodiments, one or more chain links are provided so that wear in two or more directions are provided. In the embodiments shown in the figures, wear in three directions that are substantially perpendicular to each other may be monitored simultaneously (step 310).

Once signs of wear are detected, the orientation of the chain or chain link may be changed in various ways. In some embodiments, the chain or chain link may be rotated a predetermined amount (step 312). In some cases, this may be about the load vector and done in ninety degree intervals. In other cases, this may be done about an axis perpendicular to the load vector such as Z-axis as shown in the figures. The amount of change in orientation may be any predetermined amount including those less than or greater than ninety degrees, etc.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A chain link comprising:

a body including two end portions and two middle portions connecting the two end portions together, wherein at least one middle portion defines at least one region including at least one wear indicator, wherein the body defines a center of mass and a Cartesian coordinate system with an X-axis, Y-axis, a Z-axis and an origin positioned at the center of mass, the end portions define a load vector for the body of the chain link and the X-axis of the coordinate system is oriented parallel with the load vector, and the at least one middle portion defines a first surface defining a first surface normal that is non-parallel to the X-axis*, the Y-axis, and the Z-axis*, and the at least one wear indicator is disposed on the first surface[, and wherein the first surface normal is non-parallel to the Z-axis and the Y-axis]*, and includes a first pocket defined by the first surface*.

[2. The chain link of claim 1, wherein the at least one wear indicator includes a first pocket defined by the first surface.]

3. The chain link of claim [2] *1*, wherein the first pocket is elongated along a direction parallel with the [Z-axis] *X-axis* defining its maximum dimension oriented along the [Y-axis] *X-axis*, the first pocket further defining a width along a direction parallel with the [X-axis] *Y-axis* and a depth along a direction parallel with the [Y-axis] *Z-axis*.

4. The chain link of claim 3, wherein the at least one middle portion defines a second surface defining a second surface normal that is non-parallel to the X-axis.

5. The chain link of claim 4, wherein the second surface includes a second wear indicator in the form of a second pocket that is elongated along a direction parallel with the [X-axis] *Z-axis* defining its maximum dimension oriented along the [X-axis] *Z-axis*, the second pocket further defining a width along a direction parallel with the [Y-axis] *X-axis* and a depth along a direction parallel with the [Z-axis] *Y-axis*.

6. The chain link of claim 5, wherein [second] *the first* pocket defines a bottom extremity positioned along a direction parallel with the Z-axis, the [first] *second* pocket defines an end extremity positioned along a direction parallel along the Z-axis, the Cartesian coordinate system establishes a first [X-Z] *X-Y* plane positioned at the origin of the Cartesian coordinate system and the body of the chain link defines a second [X-Z] *X-Y* plane spaced away from the first [X-Z] *X-Y* plane that is disposed between the bottom extremity of the [second] *first* pocket and the end extremity of the [first] *second* pocket.

7. The chain link of claim 6, wherein the Cartesian coordinate system establishes a X-Y plane and a Y-Z, plane, and the body of the chain link is symmetrical about the X-Y plane, the first X-Z plane and the Y-Z plane.

8. A chain assembly comprising:

at least two chain links interconnected with each other; and at least one of the chain links includes a body including two end portions, wherein at least one end portion defines a bite region including a bite contact surface configured to contact the other chain link and that defines a load vector, the at least one end portion including a first portion with a reduced cross-section defining a first thickness measured along a direction that is non-parallel to the load vector, and a raised rib disposed between the bite region and the first portion along a direction parallel with the load vector, the raised rib defining a second thickness along a direction that is non-parallel to the load vector, wherein the second thickness is greater than the first thickness*;*

*wherein the body defines a center of mass and a Cartesian coordinate system with an X-axis, Y-axis, a Z-axis and an origin positioned at the center of mass, both the end portions defining a load vector for the body of the at least one of the chain links and the X-axis of the coordinate system is oriented parallel with the load vector, and the body further includes a*

*first middle portion and a second middle portion connecting the two end portions together, forming an enclosed perimeter, and the first middle portion defines a first region including a first wear indicator and a second region including a second wear indicator that has an elongated shape that is perpendicular to the load vector.*

[9. The chain assembly of claim 8, wherein the body defines a center of mass and a Cartesian coordinate system with an X-axis, Y-axis, a Z-axis and an origin positioned at the center of mass, both the end portions defining a load vector for the body of the at least one of the chain links and the X-axis of the coordinate system is oriented parallel with the load vector, and the body further includes a first middle portion and a second middle portion connecting the two end portions together, forming an enclosed perimeter.]

10. The chain assembly of claim [9] *8*, wherein the at least one end portion defines a first curved portion extending from the first middle portion to the second middle portion and the raised rib extends from the first middle portion to the second middle portion along the first curved portion.

11. The chain assembly of claim 10, wherein the body further defines a radiused portion that transitions from the raised rib to the first portion with a reduced cross-section.

12. The chain assembly of claim [9] *8*, wherein the first middle portion and the second middle portion are straight, extending along a direction parallel to the X-axis.

[13. The chain assembly of claim 12, wherein the at least one middle portion defines a first region including at least a first wear indicator, and a second region including at least a second wear indicator.]

14. The chain assembly of claim [13] *12*, wherein the first wear indicator has an elongated shape extending in a direction parallel to the load vector [and the second wear indicator has a second elongated shape extending in a direction perpendicular to the load vector].

15. The chain assembly of claim 8, wherein the first and second thicknesses are measured in a direction perpendicular to the load vector and the ratio of the second thickness to the first thickness ranges from 1.1 to 1.5.

16. The chain assembly of claim 8, wherein the at least one end portion defines a first extremity along a direction that is parallel to the load vector and the first portion with a reduced cross-section defines a third thickness measured along a direction that is parallel to the load vector from first extremity to the raised rib, and the raised rib defines a fourth thickness measured along a direction that is parallel to the load vector from the first portion with a reduced cross-section to the bite contact surface, and a ratio of the fourth thickness to the third thickness ranges from 0.30 to 0.50.

*17. The chain assembly of claim 12, wherein the at least first wear indicator has an elongated shape extending in a direction parallel to the load vector.*

*18. A chain link comprising:*

*a body including two end portions, wherein at least one end portion defines a bite region including a bite contact surface that defines a load vector, the at least one end portion including a first portion with a reduced cross-section defining a first thickness measured along a direction that is non-parallel to the load vector, and a raised rib disposed between the bite region and the first portion along a direction parallel with the load vector, the raised rib defining a second thickness along a direction that is non-parallel to the load vector, wherein the second thickness is greater than the first thickness; and*

*the body further includes a first middle portion and a second middle portion connecting the two end portions together, and the first middle portion defines a first region including a first wear indicator and a second region including a second wear indicator that has an elongated shape that is perpendicular to the load vector.*

*19. The chain link of claim 18, wherein the body defines a center of mass and a Cartesian coordinate system with an X-axis, Y-axis, a Z-axis and an origin positioned at the center of mass, both the end portions defining a load vector for the body, and the X-axis of the coordinate system is oriented parallel with the load vector.*

*20. The chain link of claim 19, wherein the at least one end portion defines a first curved portion extending from the first middle portion to the second middle portion and the raised rib extends from the first middle portion to the second middle portion along the first curved portion.*

*21. The chain link of claim 20, wherein the body further defines a radiused portion that transitions from the raised rib to the first portion with a reduced cross-section.*

*22. The chain link of claim 19, wherein the first middle portion and the second middle portion are straight, extending along a direction parallel to the X-axis.*

*23. The chain link of claim 22, wherein the at least first wear indicator has an elongated shape extending in a direction parallel to the load vector.*

*24. The chain link of claim 18, wherein the first wear indicator has an elongated shape extending in a direction parallel to the load vector.*

*25. The chain link of claim 18, wherein the first and second thicknesses are measured in a direction perpendicular to the load vector and the ratio of the second thickness to the first thickness ranges from 1.1 to 1.5.*

*26. The chain link of clam 18, wherein the at least one end portion defines a first extremity along a direction that is parallel to the load vector and the first portion with a reduced cross-section defines a third thickness measured along a direction that is parallel to the load vector from first extremity to the raised rib, and the raised rib defines a fourth thickness measured along a direction that is parallel to the load vector from the first portion with a reduced cross-section to the bite contact surface, and a ratio of the fourth thickness to the third thickness ranges from 0.30 to 0.50.*

*27. A chain link comprising:*

*a body including two end portions and two middle portions connecting the two end portions together, wherein at least one middle portion defines at least one region including at least one wear indicator; and*

*wherein the body defines a center of mass and a Cartesian coordinate system with an X-axis, Y-axis, a Z-axis and an origin positioned at the center of mass, the end portions define a load vector for the body of the chain link and the X-axis of the coordinate system is oriented parallel with the load vector, and the at least one middle portion defines a first surface defining a first surface normal that is non parallel to the Z-axis, and the Y-axis, and a second surface defining a second surface normal that is parallel to the Y-axis.*

*28. The chain link of claim 27, wherein the at least one wear indicator includes a first pocket defined by the first surface.*

*29. The chain link of claim 28, wherein the first pocket is elongated along a direction parallel with the X-axis defining its maximum dimension oriented along the X-axis, the first*

*pocket further defining a width along a direction parallel with the Y-axis and a depth along a direction parallel with the Z-axis.*

*30. The chain link of claim 29, wherein the second surface includes a second wear indicator.*

*31. The chain link of claim 30, wherein the second wear indicator is in the form of a second pocket that is elongated along a direction parallel with the Z-axis defining its maximum dimension oriented along the Z-axis, the second pocket further defining a width along a direction parallel with the X-axis and a depth along a direction parallel with the Y-axis.*

*32. The chain link of claim 31, wherein the Cartesian coordinate system establishes a X-Y plane, a X-Z plane, and a Y-Z, plane, and the body of the chain link is symmetrical about the X-Y plane, the X-Z plane and the Y-Z plane.*

* * * * *